United States Patent
Balestra et al.

(10) Patent No.: US 6,670,111 B2
(45) Date of Patent: Dec. 30, 2003

(54) PHOTOGRAPHIC DISPERSIONS FOR YELLOW FILTER DYES

(75) Inventors: Corrado Balestra, Millesimo (IT); Mauro Besio, Vado Ligure (IT); Emilio Prosperi, Genova Voltri (IT)

(73) Assignee: Ferrania, S.p.A., Savona (IT)

( * ) Notice: Subject to any disclaimer, the term of this patent is extended or adjusted under 35 U.S.C. 154(b) by 0 days.

(21) Appl. No.: 10/236,622

(22) Filed: Sep. 5, 2002

(65) Prior Publication Data

US 2003/0118957 A1 Jun. 26, 2003

(30) Foreign Application Priority Data

Oct. 30, 2001 (IT) ...................... SV2001A0038

(51) Int. Cl.[7] .............. G03C 1/40; G03C 1/38; G03C 1/83; C09K 13/00; C09D 105/00

(52) U.S. Cl. .............. 430/522; 430/507; 430/639; 8/577; 8/579; 106/31.36; 106/31.94; 106/146.1; 106/146.4; 106/162.1; 106/217.5

(58) Field of Search ................ 430/222, 507, 430/522, 639, 517, 546; 106/31.36, 31.94, 146.1, 146.4, 217.5, 162.1; 8/577, 579

(56) References Cited

U.S. PATENT DOCUMENTS

| | | | |
|---|---|---|---|
| 3,318,714 A | 5/1967 | Coney et al. | 106/193 |
| 3,516,833 A | 6/1970 | Hagge et al. | 430/639 |
| 3,564,576 A | 2/1971 | Knox, Jr. et al. | 96/114.5 |
| 3,676,142 A | 7/1972 | Carpentier et al. | 96/100 |
| 4,181,527 A | 1/1980 | Toda et al. | 430/543 |
| 5,013,640 A * | 5/1991 | Bagchi et al. | 430/639 |
| 5,176,746 A * | 1/1993 | Nakanishi et al. | 106/25 R |
| 5,296,344 A | 3/1994 | Jimbo et al. | 430/522 |
| 5,300,418 A * | 4/1994 | Visconte et al. | 430/639 |
| 5,393,648 A | 2/1995 | Toda et al. | 430/522 |
| 5,426,019 A * | 6/1995 | Chari | 430/639 |
| 5,451,497 A | 9/1995 | Miller et al. | 430/546 |
| 5,468,604 A | 11/1995 | Zengerle et al. | 430/631 |
| 6,045,985 A | 4/2000 | Cavalleri et al. | 430/507 |
| 6,518,005 B2 * | 2/2003 | Cavalleri et al. | 430/522 |

FOREIGN PATENT DOCUMENTS

| | | | |
|---|---|---|---|
| EP | 0 66 588 A2 | 5/1995 | G03C/1/005 |
| EP | 1 170 629 A2 | 7/2000 | G03C/1/83 |

* cited by examiner

Primary Examiner—Richard L. Schilling
(74) Attorney, Agent, or Firm—Mark A. Litman & Assoc. P.A.

(57) ABSTRACT

The present invention refers to a process for preparing a dispersion which comprises codispersing in an aqueous medium a sucrose derivative represented by the following general formula (1), wherein substituents $X_1$ to $X_8$, being the same or different, are represented by a hydrogen atom, an alkyl group or an acyl group, with the proviso that at least four of the $X_1$ to $X_8$ substituents are different from hydrogen and that the total sum of the carbon atoms of $X_1$ to $X_8$ substituents is at least sixteen; and a photographic compound represented by the following general formula (2), wherein R and $R_1$ each independently represent a hydrogen atom, an alkyl group, an alkylene group, a heterocyclic group or an aryl group; $R_2$, $R_3$ and $R_4$ each independently represent a hydrogen atom, an alkyl group, an aryl group and $R_3$ and $R_4$ may be combined to form a 6-membered ring.

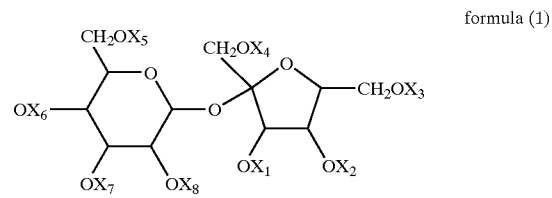

formula (1)

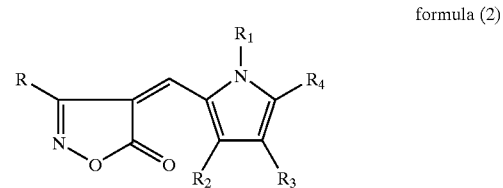

formula (2)

The present invention also refers to a photographic dispersion comprising a sucrose derivative represented by previous general formula (1) and a photographic compound represented by previous general formula (2) dispersed in an aqueous medium and to a photographic element comprising a film support base having coated on one side thereof at least one hydrophilic colloid emulsion layer comprising said photographic dispersion. The process of the present invention allows photographic dispersions to display a narrow drop size distribution curve even when stored for a long period of time (30 days) in cold room.

16 Claims, No Drawings

PHOTOGRAPHIC DISPERSIONS FOR YELLOW FILTER DYES

BACKGROUND OF THE INVENTION

1. Field of the Invention

This invention relates to a photographic dispersion comprising a sucrose derivative and a photographic compound.

2. Background of the Art

Hydrophobic compounds are introduced into hydrophilic photographic layers by the common practice in the photographic industry of dispersing a solution of the hydrophobic compounds in an organic solvent into a water medium, normally into a gelatin and surfactant water solution. In order to improve the stability of such dispersions, the hydrophobic compounds are frequently dissolved in high boiling organic solvents (also referred to in the art as permanent solvents, crystalloidal solvents, oil-type solvents, oil-formers and the like). In some cases, it may be advantageous to facilitate the dissolution of the hydrophobic compound by using an auxiliary water-immiscible or water-miscible low boiling organic solvent, which is removed afterwards by evaporation. Permanent high boiling solvents have a boiling point sufficiently high, generally above 150° C. at atmospheric pressure, such that they are not rapidly evaporated under normal dispersion making and photographic layer coating procedures. Permanent high-boiling solvents are primarily used in the conventional "oil-protection" dispersion method whereby the organic solvent remains in the dispersion, and thereby is incorporated into the emulsion layer coating solution and ultimately into the photographic element. Typical permanent solvent are, for example, tricresyl phosphate or dibutylphthalate.

Generally a photographic element comprises a plurality of layers, at least one of which comprises a silver halide emulsion, coated onto a support. During, or just prior to, the coating step, the dispersion may be heated to about 45° C. and maintained at that temperature for up to 24 hours. It has been noted that in certain cases the dispersed particles containing the photographically useful compound can undesirably grow in the dispersion as a result of relative dissolving and reprecipitation of particle material and solvent. This particle growth can cause the photographically useful compound to become less effective for its intended purpose.

One method of slowing the particle growth in photographic dispersions is disclosed in U.S. Pat. No. 4,181,527 to Toda et al. Toda et al. disclose that incorporation of organic solvent gelling agents, such as N-acylamino acid amides, N-acylamino acid amine salts, and dehydrated condensates of benzaldehydes and sorbitol or xylitol, into a photographic dispersion solidifies or "gels" the oil phase of the dispersion, thereby inhibiting particle growth. While this method does slow particle growth, the resulting viscosity increase of the dispersed phase containing the photographically useful compound can result in undesired decreases in performance such as reactivity or lubricity.

U.S. Pat. No. 5,468,604 discloses that certain hydrophobic, photographically inert compounds which do not solidify or gel the dispersed liquid organic phase can effectively inhibit undesired particle growth in photographic dispersions subject to such particle growth.

U.S. Pat. No. 6,045,985 and EP patent application No. 1,170,629, for example, disclose photographic dyes showing good solubility into the common permanent solvents. However, even a good dispersion of these molecules, obtained using tricresyl phosphate or dibuthylphtalate as permanent solvent, is unstable when stored for a long period of time with an evident change of the drop size distribution and a consequent increase of the average diameters.

U.S. Pat. No. 5,451,497 and European Patent Application EP 661,588 describe photographic dispersions containing photographically useful compounds, a main permanent solvent and a non-color forming, oil-soluble, monomeric or oligomeric organic compound having a glass transition temperature between 0° and 150° C., such as, for example, oil-soluble sucrose esters and rosin and derivatives thereof to inhibit the crystallization of the photographic useful compounds, in particular inhibiting crystallization of photographic couplers. U.S. Pat. Nos. 3,564,576; 3,676,142 and 3,516,833 also disclose sucrose esters as auxiliary solvents.

SUMMARY OF THE INVENTION

The present invention refers to a process for preparing a dispersion which comprises codispersing in an aqueous medium a sucrose derivative represented by general formula (1):

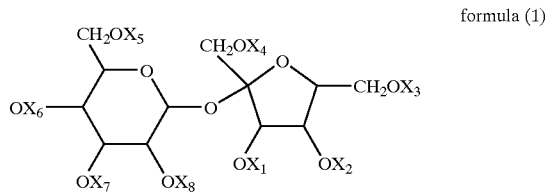

formula (1)

wherein substituents $X_1$ to $X_8$, being the same or different, are represented by a hydrogen atom, an alkyl group or an acyl group, with the proviso that at least four of the $X_1$ to $X_8$ substituents are different from hydrogen and that the total sum of the carbon atoms of $X_1$ to $X_8$ substituents is at least sixteen;

and a photographic compound represented by general formula (2):

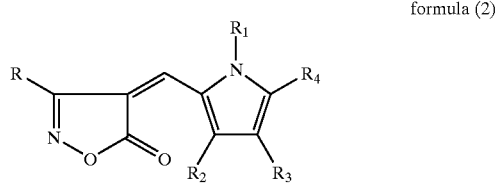

formula (2)

wherein R and $R_1$ each independently represent a hydrogen atom, a substituted or unsubstituted alkyl group, a substituted or unsubstituted alkylene group, a substituted or unsubstituted heterocyclic group or a substituted or unsubstituted aryl group; $R_2$, $R_3$ and $R_4$ each independently represent a hydrogen atom, a substituted or unsubstituted alkyl group, a substituted or unsubstituted aryl group and $R_3$ and $R_4$ may be combined to form a 6-membered ring.

The present invention also refers to a photographic dispersion comprising a sucrose derivative represented by previous general formula (1) and a photographic compound represented by previous general formula (2) dispersed in an aqueous medium and to a photographic element comprising a film support base having coated on at least one side thereof at least one hydrophilic colloid emulsion layer comprising said photographic dispersion.

Stable dispersions of these classes of photographic compounds, such as for example the compounds described in EP patent application No. 1,170,629, can be easily prepared using a sucrose derivative. The drop size distribution for these dispersed photographic compounds is narrow and change in drop size distribution is inhibited even when stored for a long period of time (e.g., 30 days) in a cold room (e.g., 5° C.).

DETAILED DESCRIPTION OF THE INVENTION

Accordingly, one aspect of the present invention relates to process for preparing a dispersion which comprises codispersing in an aqueous medium a sucrose derivative represented by the above described general formula (1) and a photographic compound represented by the above described general formula (2).

In particular, in formula (1),

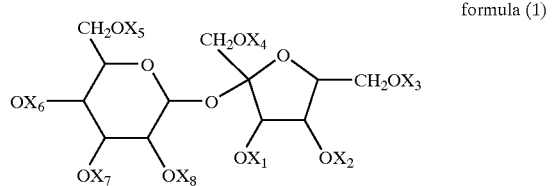

formula (1)

$X_1$ to $X_8$ substituents, being the same or different, represent a hydrogen atom, an alkyl group (e.g., substituted or unsubstituted) or an acyl group (substituted or unsubstituted. Preferred alkyl groups include 1 to 8 carbon atom alkyl groups comprising linear or branched-chain alkyl groups, such as, for example, methyl group, trifluoromethyl group, ethyl group, propyl group, isopropyl group, butyl group, tert.-butyl group, neo-pentyl group, and octyl group. Preferred acyl groups include 1 to 8 carbon atom acyls comprising linear or branched-chain acyls, such as, for example, formyl group, acetyl group, chloroacetyl group, fluoroacetyl group, trichloroacetyl group, propionyl group, butyryl group, isobutyryl group, valeryl group, and pivaloyl group, or aromatic acyls, such as, for example, benzoyl group, phthaloyl group, naphthoyl group, toluoyl group. According to the substituent types from $X_1$ to $X_8$, the sucrose derivatives useful in the present invention are therefore represented by sucrose ethers or esters. Preferably, the $X_1$ to $X_8$ substituents are acyl groups, and more preferably are acyl groups having from 2 to 7 carbon atoms, such as acetyl group, propionyl group, butyryl group, isobutyryl group or benzoyl group.

When in the present invention the term "group" is used to define a chemical compound or substituent, the described chemical material comprises the basic group, ring or residue and that group, ring or residue with conventional substitutions. When on the contrary the term "units" is used, only the chemical unsubstituted material is intended to be included. For instance, the term "alkyl group" comprises not only those alkyl units such as methyl, ethyl, butyl, octyl, stearyl, etc., but even those units bearing substituents such as halogen atoms, cyano, hyroxyl, nitro, amino, carboxylate groups, etc. The term "alkyl units" on the contrary comprises only methyl, ethyl, stearyl, cyclohexyl, etc.

At least four of the $X_1$ to $X_8$ substituents in previous general formula (1) are different from hydrogen; preferably, at least six of the $X_1$ to $X_8$ substituents are different from hydrogen; more preferably, all the $X_1$ to $X_8$ substituents are different from hydrogen.

The total sum of the carbon atoms of $X_1$ to $X_8$ substituents in previous general formula (1) may be at least sixteen; preferably, at least twenty; and more preferably, at least twenty-four.

The preferred sucrose derivatives used in the present invention are sucrose benzoate, sucrose diacetate hexaisobutyrate, sucrose diacetate hexabutyrate, sucrose diacetate hexapropionate and sucrose triacetate pentaisobutyrate. Sucrose diacetate hexaisobutyrate is a fully-esterified sucrose molecule, esterified with two acetic acid and six isobutyric acid moieties, commercially available from Eastman Chemical Co. as SAIB™100. Sucrose benzoate is a quite fully-esterified sucrose molecule, esterified with at least 7 benzoyl groups, commercially available as Uniplex™ 280 CG. It can be prepared according to procedures well known in the art of sucrose derivatives. The synthesis has been described, for example, by Salim N. in *Bull. Coll. Sci.*, 1973, Vol. 14, pages 99–101, by Fang Yirong in *Shanghai Huagong*, 1997, Vol. 22, No. 4, pages 10–13 or by Coney, Charles H. in *ACS Symp. Ser.*, 1977, Vol. 41, *Sucrochem., Symp.*, pages 213–22.

In formula (2)

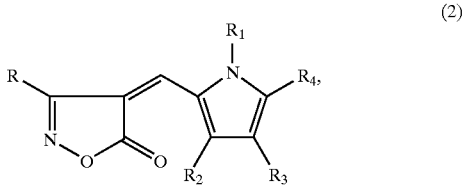

(2)

R and $R_1$ independently represent a hydrogen atom, an alkyl group (e.g., substituted or unsubstituted), an alkylene group (e.g., substituted or unsubstituted), a heterocyclic group (e.g., substituted or unsubstituted) or an aryl group (e.g., substituted or unsubstituted). Preferred alkyl groups represented by R and $R_1$ include 1 to 8 carbon atom alkyls comprising linear or branched-chain alkyls, such as methyl, trifluoromethyl, ethyl, propyl, isopropyl, butyl, tert.-butyl and octyl. Preferred alkylene groups represented by R and $R_1$ include 1 to 8 carbon atom alkylenes comprising linear or branched-chain alkylenes, such as ethylene, propylene, isopropylene, butylene, and others. Preferred aryl groups represented by R and $R_1$ include 6 to 10 carbon atom aryls, such as phenyl and naphthyl. Preferred heterocyclic groups represented by R and $R_1$ include 5 or 6-membered heterocyclic groups which may also be fused with other ring systems, such as for example furane, thiophene, pyridine, pyrrole and imidazole. These alkyl, alkylene, heterocycle and aryl groups may be substituted with general substituents well understood in the chemical arts. Particularly useful substituents include for instance aryloxy groups (e.g., phenoxy, p-methoxyphenoxy, p-methylphenoxy, naphthyloxy and tolyloxy); acylamino groups (e.g., acetamide, benzamide, butyramide and tert.-butylcarbonamide); sulfonamide groups (e.g., methylsulfonamide, benzenesulfonamide and p-tolylsulfonamide); sulfamoyl groups (e.g., N-methylsulfamoyl, N,N-diethylsulfamoyl and N,N-dimethylsulfamoyl); carbamoyl groups (e.g., N-methylcarbamoyl and N,N-dimethylcarbamoyl); arylsulfonyl groups (e.g., tolylsulfonyl); aryloxycarbonyl groups (e.g., phenoxycarbonyl); alkoxy-carbonyl groups (e.g., alkoxycarbonyl containing from 2 to 10 carbon atoms, such as methoxycarbonyl, ethoxycarbonyl and benzyloxycarbonyl); alkoxy-sulfonyl groups (e.g., alkoxysulfonyl containing from 2 to 10 carbon atoms, such as methoxysulfonyl, octyloxysulfonyl and 2-ethylhexylsulfonyl); aryl-oxysulfonyl groups (e.g., phenoxysulfonyl); alkylureido groups (e.g., N-methylureido, N,N-dimethylureido and N,N-dibutylureido); arylureido groups (e.g., phenylureido); halogen atoms, hydroxy, sulfo, sulfate, carboxyl, amino, alkyl, alkoxy, nitro and cyano groups.

In formula (2) above $R_2$, $R_3$ and $R_4$ each independently represent a hydrogen atom, an alkyl group or an aryl group (for a detailed description, see the definitions given for R and $R_1$) and $R_3$ and $R_4$ can combine together to form a 6-membered heterocyclic ring, for instance an indole ring.

Among the photographic compounds of formula (2), the particularly preferred ones are those belonging to the following formula (3):

formula (3)

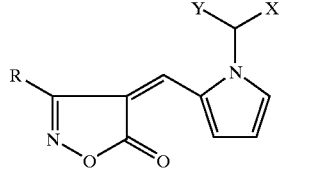

wherein R is as defined in formula (2), X represents a hydrogen atom or a 1 to 6 carbon atom linear or branched-chain alkyl group, and Y represents $-COO-(CH_2-CH_2-O)_n-Z$ or $-COO-(CH(CH_3)-CH_2-O)_n-Z$, where n=0, 1, 2 or 3 and Z being a 1 to 4 carbon atom linear or branched-chain alkyl group.

Specific examples of photographic compounds of general formula (2) are illustrated below, but the present invention should not be construed as being limited thereto. These formulae may also represent central nuclei of compounds that may be substituted on any available position (without altering the underlying bond structure) and still be within the practice of the invention. For example, the bridging phenyl group may be substituted as might be alkyl and methylene groups.

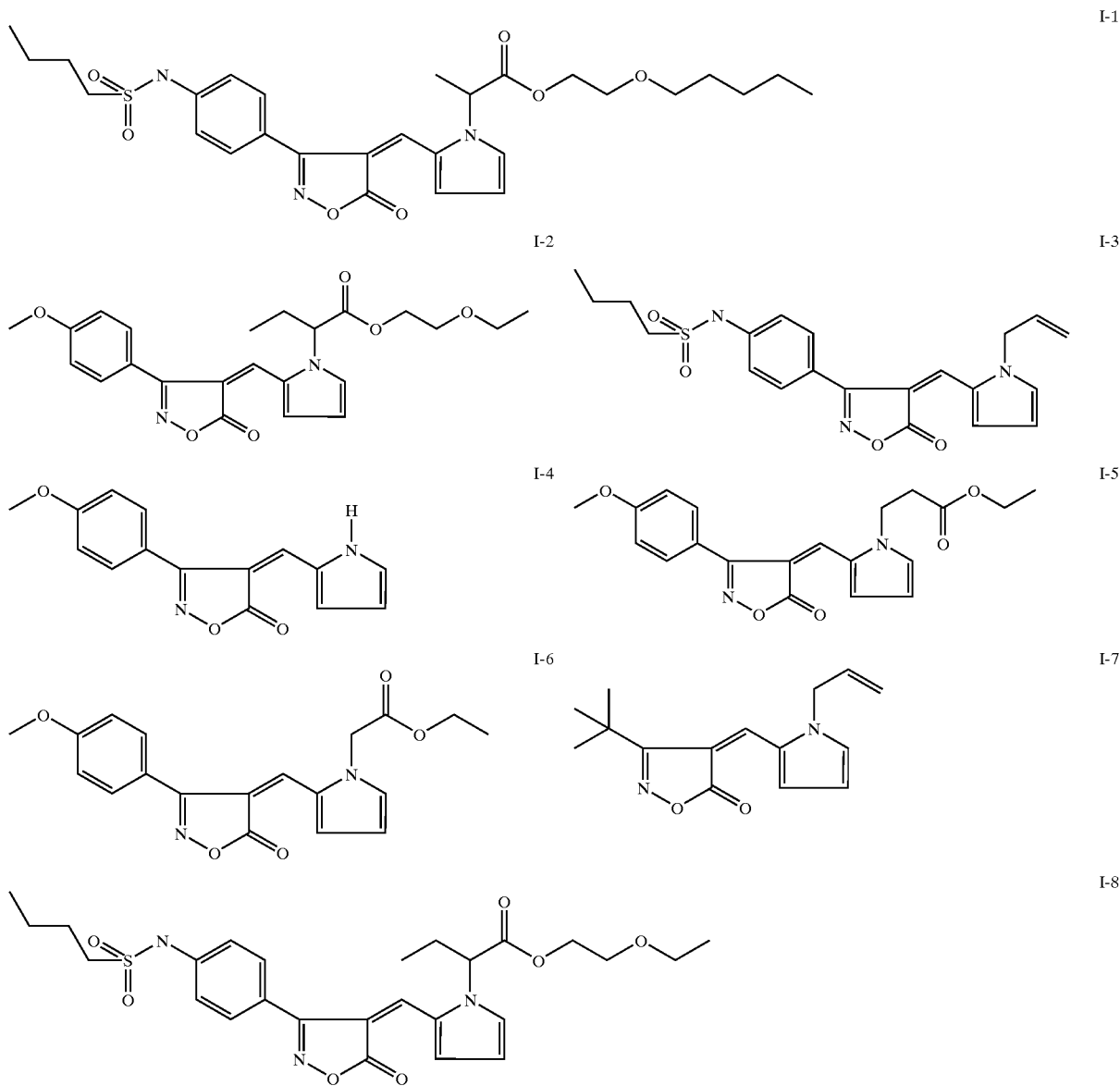

The photographic compounds of formula (2) can be prepared according to procedures well known in the art of organic chemical dyes. The synthesis of photographic compounds according to formula (2) is described, for example, in EP Patent Application No. 01114950.7.

In a preferred embodiment, the photographic compound of formula (2) is a filter dye to be incorporated in a filter layer of any photographic element. Preferably, the filter dye is a yellow filter dye to be incorporated in a yellow filter layer in any photographic element where it is desirable to absorb blue light. The yellow filter layer is especially useful in photographic elements having at least one silver halide emulsion layer that is sensitive to at least one portion of radiation of the electromagnetic spectrum other than blue light in addition to its intrinsic sensitivity to blue light. In such a case, the yellow filter layer can be used to reduce or prevent blue light from reaching this at least one silver halide emulsion layer, and to assure the response of the at least one silver halide emulsion to the radiation to which it is sensitized rather than to blue light.

One preferred embodiment of the process of the present invention comprises mixing the sucrose derivative of formula (1) and the photographic compound of formula (2) with an aqueous media comprising a surfactant and a hydrophilic colloid, emulsifying the mixture using any conventional mixing apparatus, and adding the resultant dispersion into a photographic coating mixture containing a hydrophilic colloid.

In the process of the present invention, the sucrose derivative of formula (1) and the photographic compound of formula (2) are preferably mixed together prior to preparing the dispersion in the aqueous medium. They are preferably mixed in a sucrose derivative to photographic compound weight ratio of from 0.5:1 to 4:1, more preferably from 1:1 to 3:1.

Auxiliary water-immiscible or water-miscible low boiling organic solvents well known in the art, as described, for example, in U.S. Pat. Nos. 2,801,170, 2,801,171 and 2,949,360, can be preferably added to the mixture of sucrose derivative and photographic compound used in the present invention. Examples of useful auxiliary organic solvents include ethyl acetate, carbon tetrachloride, methyl ethyl ketone, benzene, ligroine, methanol, ethanol, dimethylsulfoxide, tetrahydrofuran, dioxan, and acetone. The auxiliary organic solvents are preferably added to the mixture of sucrose derivative and photographic compound used in the present invention in a auxiliary solvent to mixture ratio of from 0.2:1 to 4:1, more preferably from about 0.5:1 to 2:1.

Nonionic surfactants can be also preferably added to the mixture of sucrose derivative and photographic compound used in the present invention. Nonionic surfactants include, for example, polyoxyethylene alkyl ethers such as polyoxyethylene lauryl ether, polyoxyethylene stearyl ether, polyoxyethylene cetyl ether, polyoxyethylene oleyl ether; polyoxyethylene alkyl aryl ethers such as polyoxyethylene octyl phenol ether, polyoxyethylene nonyl phenol ether; polyoxyethylene-polyoxypropylene block co-polymers; sorbitan fatty acid esters such as sorbitan monolaurate, sorbitan monopalmitate, sorbitan monostearate, sorbitan monooleate, sorbitan trioleate, sorbitan tristearate; and polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate, polyoxyethylene sorbitan tristearate. Preferred nonionic surfactants are sorbitan fatty acid esters surfactants. Non-ionic surfactants are preferably added to the mixture of sucrose derivative and photographic compound used in the present invention in a surfactant to mixture ratio of from 0.02:1 to 0.5:1, more preferably from about 0.05:1 to 0.2:1.

The mixture of sucrose derivative and photographic compound is then dispersed in an aqueous media in order to prepare the resulting photographic dispersion. The aqueous media preferably comprise a hydrophilic colloid, such as hydrophilic colloids employed in the emulsion layers as known in the photographic art. Useful hydrophilic colloids include naturally occurring polymers, such as gelatine and gelatine derivatives, and synthetic organic polymers such as polyvinyl alcohols and their derivatives, acrylamide polymers, polyvinylacetals, polyacrylates, and additional binders as described in *Research Disclosure*, 17643, paragraph IX, December 1978. Useful percentage of gelatine concentration used in the dispersion of the present invention is in the range of from 1 to 50%, preferably from 5 to 20%. The aqueous solution to mixture of sucrose derivative and photographic compound ratio is in the range from 1:1 to 20:1, preferably from 2:1 to 10:1.

Surfactants are preferably added to the above described aqueous media; specific examples of a usable surfactant include nonionic, anionic, amphoteric and cationic surfactants. Nonionic surfactants include the same above described surfactants. Anionic surfactants contain, for example, acid groups, such as a carboxyl group, a sulfo group, a phospho group, a sulfuric acid ester group, a phosphoric acid ester group etc., for example, alkylcarboxylate, alkylsulfhonates, alkylbenzenesulfonates, alkylnaphthalenesulfonates, alkylsulfuric acid esters, alkylphosphoric acid esters, n-acyl-n-alkyltaurines, sulfosuccinic acid esters, sulfoalkylpolyoxyethylene alkylphenyl ether, polyoxyethylene alkylphosphoric acid esters etc. Amphoteric surfactants such as amino acids, aminoalkylsulfonic acids, aminoalkylsulfuric or phosphoric acid esters, alkylbetaines, amine oxides etc.; and cationic surfactants, such as alkylamines, aliphatic or aromatic quaternary ammonium salts, heterocyclic quaternary ammonium salts, such as pyridinium salts, imidazolium salts etc., aliphatic or heterocyclic ring-containing phosphonium or sulfonium salts etc. may be used. These surfactants are usually added in an amount of no greater than 10 parts by weight per 100 parts by weight of solid contents in the present composition. Additionally, they can be added individually or in combination of two or more thereof.

Any conventional apparatus can be used for the preparation of the photographic dispersion of the present invention, such as, for example, a high-speed mixer or a colloid mill. The resulting photographic dispersion according to the present invention is then incorporated into the photographic element of the present invention. The photographic element of the present invention comprises a film support base having coated on one side thereof at least one hydrophilic colloid emulsion layer comprising the photographic dispersion of the present invention.

In a preferred embodiment, the photographic element relates to a multilayer color photographic element comprising a support base having deposited thereon, in order from the support, a red-sensitive silver halide emulsion layer, a green-sensitive silver halide emulsion layer, and a blue-sensitive silver halide emulsion layer respectively associated with non-diffusing cyan, magenta and yellow dye-forming couplers.

When multilayer materials contain multiple red, green and blue sub-layers, these can be relatively faster and relatively slower sub-layers. These elements additionally comprise other non-light sensitive layers, such as intermediate layers, filter layers, antihalation layers and protective layers, thus forming a multilayer structure.

The photographic dispersion of the present invention can be added to any of the above described layers. The photographic dispersion of the present invention is preferably added to filter layers, and, more preferably, is added to a yellow filter layer positioned below the blue sensitive layer and above the green and red sensitive layers.

The photographic dispersion of the present invention is added to the yellow filter layer in an amount effective to absorb the blue radiation. Typically, the yellow filter layer will contain about 0.1 to 1.0, preferably about 0.15 to 0.7, gram of compound of formula (2) per square meter. The yellow dye will provide an optical density of 0.5 to 3.0, preferably 0.8 to 2.0, density units at its $\lambda_{max}$ which is typically in the range of 400 to 470 nm, preferably 410 to 440 nm. However, these amounts, ratios and optical densities can be varied outside the above ranges depending upon such factors as the particular photographic element, the yellow filter location in the element, and the amount of blue radiation which is desired to be absorbed by the yellow filter layer.

The silver halides used in the photographic elements of this invention may be a fine dispersion (emulsion) of silver chloride, silver bromide, silver chloro-bromide, silver iodo-bromide and silver chloro-iodo-bromide grains in a hydrophilic colloid. Preferred silver halides are silver iodo-bromide or silver iodo-bromo-chloride containing 1 to 20% mole silver iodide. In silver iodo-bromide emulsions or silver iodo-bromo-chloride, the iodide can be uniformly distributed among the emulsion grains, or iodide level can be varied among the grains. The silver halides can have a uniform grain size distribution or a broad grain size distribution. The silver halide grains may be regular grains having a regular crystal structure such as cubic, octahedral, and tetradecahedral, or the spherical or irregular crystal structure, or those having crystal defects such as twin plane, or those having a tabular form, or the combination thereof.

The term "cubic grains" is intended to include substantially cubic grains, that is grains which are regular cubic grains bounded by crystallographic faces (100), or which may have rounded edges and/or vertices or small faces (111), or may even be nearly spherical when prepared in the presence of soluble iodides or strong ripening agents, such as ammonia. Particularly good results are obtained with silver halide grains having average grain sizes in the range from 0.2 to 3 μm, more preferably from 0.4 to 1.5 μm. Preparation of silver halide emulsions comprising cubic silver iodobromide grains is described, for example, in Research Disclosure, Vol. 184, Item 18431, Vol. 176, Item 17644 and Vol. 308, Item 308119.

Other silver halide emulsions for use in the photographic elements of this invention are those which employ one or more light-sensitive tabular grain emulsions. Useful tabular silver halide grains have an average diameter:thickness ratio (often referred to in the art as aspect ratio) of at least 2:1, preferably 2:1 to 20:1, more preferably 3:1 to 14:1, and most preferably 3:1 to 8:1. Suitable average diameters of the tabular silver halide grains range from about 0.3 μm to about 5 μm, preferably 0.5 μm to 3 μm, more preferably 0.8 μm to 1.5 μm. The tabular silver halide grains suitable for use in this invention have a thickness of less than 0.4 μm, preferably less than 0.3 μm and more preferably less than 0.2 μm.

The tabular grain characteristics described above can be readily ascertained by procedures well known to those skilled in the art. The term "diameter" is defined as the diameter of a circle having an area equal to the projected area of the grain. The term "thickness" means the distance between two substantially parallel main planes constituting the tabular silver halide grains. From the measure of diameter and thickness of each grain the diameter:thickness ratio of each grain can be calculated, and the diameter:thickness ratios of all tabular grains can be averaged to obtain their average diameter:thickness ratio. By this definition, the average diameter:thickness ratio is the average of individual tabular grain diameter:thickness ratios. In practice, it is simpler to obtain an average diameter and an average thickness of the tabular grains and to calculate the average diameter:thickness ratio as the ratio of these two averages. Whatever the used method may be, the average diameter:thickness ratios obtained do not greatly differ.

In the silver halide emulsion layer containing tabular silver halide grains, at least 15%, preferably at least 25%, and, more preferably, at least 50% of the silver halide grains are tabular grains having an average diameter:thickness ratio of not less than 2:1. Each of the above proportions, "15%", "25%" and "50%" means the proportion of the total projected area of the tabular grains having a diameter:thickness ratio of at least 2:1 and a thickness lower than 0.4 μm, as compared to the projected area of all of the silver halide grains in the layer.

It is known that photosensitive silver halide emulsions can be formed by precipitating silver halide grains in an aqueous dispersing medium comprising a hydrophilic colloid, gelatin preferably being used as a hydrophilic colloid.

The silver halide grains may be precipitated by a variety of conventional techniques. The silver halide emulsion can be prepared using a single-jet method, a double-jet method, or a combination of these methods or can be matured using, for instance, an ammonia method, a neutralization method, an acid method, or can be performed an accelerated or constant flow rate precipitation, interrupted precipitation, ultrafiltration during precipitation, etc. References can be found in Trivelli and Smith, *The Photographic Journal,* Vol. LXXIX, May 1939, pp. 330–338, T. H. James, *The Theory of The Photographic Process,* 4th Edition, Chapter 3, U.S. Pat. Nos. 2,222,264, 3,650,757, 3,917,485, 3,790,387, 3,716,276, and 3,979,213, Research Disclosure, December 1989, Item 308119 "Photographic Silver Halide Emulsions, Preparations, Addenda, Processing and Systems", and Research Disclosure, September 1976, Item 14987.

One common technique is a batch process commonly referred to as the double-jet precipitation process by which a silver salt solution in water and a halide salt solution in water are concurrently added into a reaction vessel containing the dispersing medium.

In the double jet method, in which alkaline halide solution and silver nitrate solution are concurrently added in the gelatin solution, the shape and size of the formed silver halide grains can be controlled by the kind and concentration of the solvent existing in the gelatin solution and by the addition speed. Double-jet precipitation processes are described, for example, in GB patents 1,027,146, and 1,302, 405, U.S. Pat. Nos. 3,801,326, 4,046,376, 3,790,386, 3,897, 935, 4,147,551, and 4,171,224.

The single jet method in which a silver nitrate solution is added in a halide and gelatin solution has been long used for manufacturing photographic emulsion. In this method, because the varying concentration of halides in the solution determines which silver halide grains are formed, the formed silver halide grains are a mixture of different kinds of shapes and sizes.

Precipitation of silver halide grains usually occurs in two distinct stages. In a first stage, nucleation, the formation of fine silver halide grain occurs. This is followed by a second stage, the growth stage, in which additional silver halide formed as a reaction product precipitates onto the initially formed silver halide grains, resulting in a growth of these silver halide grains. Batch double-jet precipitation processes are typically under-taken under conditions of rapid stirring of reactants in which the volume within the reaction vessel continuously increases during silver halide precipitation and soluble salts are formed in addition to the silver halide grains.

In order to avoid soluble salts in the emulsion layers of a photographic element from crystallizing out after coating and other photographic or mechanical disadvantages (stickiness, brittleness, etc.), the soluble salts formed during precipitation have to be removed.

In preparing the silver halide emulsions, a wide variety of hydrophilic dispersing agents for the silver halides can be employed. As hydrophilic dispersing agent, any hydrophilic polymer conventionally used in photography can be advantageously employed including gelatin, a gelatin derivative such as acylated gelatin, graft gelatin, etc., albumin, gum arabic, agar agar, a cellulose derivative, such as hydroxyethylcellulose, carboxymethylcellulose, etc., a synthetic resin, such as polyvinyl alcohol, polyvinylpyrrolidone, polyacrylamide, etc. Other hydrophilic materials useful known in the art are described, for example, in Research Disclosure, Vol. 308, Item 308119, Section IX.

The silver halide grain emulsion can be chemically sensitized using sensitizing agents known in the art. Sulfur containing compounds, gold and noble metal compounds, and polyoxyalkylene compounds are particularly suitable. In particular, the silver halide emulsions may be chemically sensitized with a sulfur sensitizer, such as sodium thiosulfate, allylthiocyanate, allylthiourea, thiosulfinic acid and its sodium salt, sulfonic acid and its sodium salt, allylthiocarbamide, thiourea, cystine, etc.; an active or inert selenium sensitizer; a reducing sensitizer such as stannous salt, a polyamine, etc.; a noble metal sensitizer, such as gold sensitizer, more specifically potassium aurithiocyanate, potassium chloroaurate, etc.; or a sensitizer of a water soluble salt such as for instance of ruthenium, rhodium, iridium and the like, more specifically, ammonium chloropalladate, potassium chloroplatinate and sodium chloropalladite, etc.; each being employed either alone or in a suitable combination. Other useful examples of chemical sensitizers are described, for example, in Research Disclosure 17643, Section III, 1978 and in Research Disclosure 308119, Section III, 1989.

The silver halide emulsion can be spectrally sensitized with dyes from a variety of classes, including the polymethyne dye class, which includes the cyanines, merocyanines, complex cyanines and merocyanines, squarines, oxonols, hemioxonols, styryls, merostyryls, and streptocyanines.

The cyanine spectral sensitizing dyes include, joined by a methine linkage, two basic heterocyclic nuclei, such as those derived from quinoline, pyrimidine, isoquinoline, indole, benzindole, oxazole, thiazole, selenazole, imidazole, benzoxazole, benzothiazole, benzoselenazole, benzoimidazole, naphthoxazole, naphthothiazole, naphthoselenazole, tellurazole, oxatellurazole.

The merocyanine spectral sensitizing dyes include, joined by a methine linkage, a basic heterocyclic nucleus of the cyanine-dye type and an acidic nucleus, which can be derived from barbituric acid, 2-thiobarbituric acid, rhodanine, hydantoin, 2-thiohydantoin, 2-pyrazolin-5-one, 2-isoxazolin-5-one, indan-1,3-dione, cyclohexane-1,3-dione, 1,3-dioxane-4,6-dione, pyrazolin-3,5-dione, pentane-2,4-dione, alkylsulfonyl-acetonitrile, malononitrile, isoquinolin-4-one, chromane-2,4-dione, and the like.

One or more spectral sensitizing dyes may be used. Dyes with sensitizing maxima at wavelengths throughout the visible and infrared spectrum and with a great variety of spectral sensitivity curve shapes are known. The choice and relative proportion of dyes depends on the region of the spectrum to which sensitivity is desired and on the shape of the spectral sensitivity desired.

Examples of sensitizing dyes can be found in Venkataraman, *The Chemistry of Synthetic Dyes,* Academic Press, New York, 1971, Chapter V, James, *The Theory of the Photographic Process,* 4th Ed., Macmillan, 1977, Chapter 8, F. M. Hamer, *Cyanine Dyes and Related Compounds,* John Wiley and Sons, 1964, and in Research Disclosure 308119, Section III, 1989.

The silver halide emulsions can contain optical brighteners, antifogging agents and stabilizers, filtering and antihalo dyes, hardeners, coating aids, plasticizers and lubricants and other auxiliary substances, as for instance described in Research Disclosure 17643, Sections V, VI, VIII, X, XI and XII, 1978, and in Research Disclosure 308119, Sections V, VI, VIII, X, XI, and XII, 1989.

The silver halide emulsion can be used for the manufacture of multilayer light-sensitive silver halide color photographic elements, such as color negative photographic elements, color reversal photographic elements, color positive photographic elements, false color address photographic elements (such as those disclosed in U.S. Pat. No. 4,619,892) and the like, the preferred photographic elements being color negative photographic elements.

Suitable color couplers are preferably selected from the couplers having diffusion preventing groups, such as groups having a hydrophobic organic residue of about 8 to 32 carbon atoms, introduced into the coupler molecule in a non-splitting-off position. Such a residue is called a "ballast group". The ballast group is bonded to the coupler nucleus directly or through an imino, ether, carbonamido, sulfonamido, ureido, ester, imido, carbamoyl, sulfamoyl bond, etc. Examples of suitable ballasting groups are described in U.S. Pat. No. 3,892,572.

The non-diffusible couplers are introduced into the light-sensitive silver halide emulsion layers or into non-light-sensitive layers adjacent thereto. On exposure and color development, said couplers give a color which is complementary to the light color to which the silver halide emulsion layers are sensitive. Consequently, at least one non-diffusible cyan-image forming color coupler, generally a phenol or an α-naphthol compound, is associated with red-sensitive silver halide emulsion layers, at least one non-diffusible magenta image-forming color coupler, generally a 5-pyrazolone or a pyrazolotriazole compound, is associated with green-sensitive silver halide emulsion layers and at least one non-diffusible yellow image forming color coupler, generally an acylacetanilide compound, is associated with blue-sensitive silver halide emulsion layers.

The color couplers may be 4-equivalent or 2-equivalent couplers, the latter requiring a smaller amount of silver halide for color production. As it is well known, 2-equivalent couplers derive from 4-equivalent couplers since, in the coupling position, they contain a substituent which is released during coupling reaction. 2-equivalent couplers which may be used in silver halide color photographic elements include both those substantially colorless and those which are colored ("masking couplers"). The 2-equivalent couplers also include white couplers which do not form any dye on reaction with the color developer oxidation products. The 2-equivalent color couplers include also DIR couplers which are capable of releasing a diffusing development inhibiting compound on reaction with the color developer oxidation products.

The most useful cyan-forming couplers are conventional phenol compounds and α-naphthol compounds. Examples of cyan couplers can be selected from those described in U.S. Pat. Nos. 2,369,929; 2,474,293; 3,591,383; 2,895,826; 3,458,315; 3,311,476; 3,419,390; 3,476,563 and 3,253,924; in GB patent 1,201,110, and in Research Disclosure 308119, Section VII, 1989.

The most useful magenta-forming couplers are conventional pyrazolone type compounds, indazolone type compounds, cyanoacetyl compounds, pyrazoletriazole type compounds, etc. and particularly preferred couplers are pyrazolone type compounds. Magenta-forming couplers are described for example in U.S. Pat. Nos. 2,600,788, 2,983, 608, 3,062,653, 3,127,269, 3,311,476, 3,419,391, 3,519,429, 3,558,319, 3,582,322, 3,615,506, 3,834,908 and 3,891,445; in DE patent 1,810,464, in DE patent applications 2,408, 665, 2,417,945, 2,418,959 and 2,424,467; in Japanese Patent applications 20826/76, 58922/77, 129538/74, 74027/74, 159336/75, 42121/77, 60233/75, 26541/76 and 55122/78.

The most useful yellow-forming couplers are conventional open-chain ketomethylene type couplers. Particular examples of such couplers are benzoyl acetanilide type and pivaloyl acetanilide type compounds. Yellow-forming couplers that can be used are specifically described in U.S. Pat. Nos. 2,875,057, 3,235,924, 3,265,506, 3,278,658, 3,369, 859, 3,408,194, 3,415,652, 3,528,322, 3,551,151, 3,682,322, 3,725,072 and 3,891,445, in DE 2,219,917, 2,261,361 and 2,414,006, GB 1,425,020, JP 10,783/76, 26,133/72, 73,147/ 73, 102,636/76, 6,341/75, 123,342/75, 130,442/75, 1,827/ 76, 87,650/75, 82,424/77 and 115,219/77, and in Research Disclosure 308119, Section VII, 1989.

Colored couplers can be used which include those described for example in U.S. Pat. Nos. 3,476,560, 2,521, 908 and 3,034,892, in JP 2,016/69, 22,335/63, 11,304/67, 32,461/69, 26,034/76 and 42,121/77 and in DE 2,418,959. The light-sensitive silver halide color photographic element may contain high molecular weight color couplers as described for example in U.S. Pat. Nos. 4,080,211, EP 27,284 and DE 1,297,417, 2,407,569, 3,148,125, 3,217,200, 3,320,079, 3,324,932, 3,331,743, and 3,340,376, and in Research Disclosure 308119, Section VII, 1989.

Colored cyan couplers can be selected from those described in U.S. Pat. Nos. 3,934,802; 3,386,301 and 2,434, 272, colored magenta couplers can be selected from the colored magenta couplers described in U.S. Pat. Nos. 2,434, 272; 3,476,564 and 3,476,560 and GB 1,464,361. Colorless couplers can be selected from those described in GB patents 861,138; 914,145 and 1,109,963 and U.S. Pat. No. 3,580, 722 and in Research Disclosure 308119, Section VII, 1989.

Also, couplers providing diffusible colored dyes can be used together with the above mentioned couplers for improving graininess and specific examples of these couplers are magenta couplers described in U.S. Pat. No. 4,366,237 and GB 2,125,570 and yellow, magenta and cyan couplers described in EP patent 96,873, DE 3,324,533 and in Research Disclosure 308119, Section VII, 1989.

Also, among the 2-equivalent couplers are those couplers which carry in the coupling position a group which is released in the color development reaction to give a certain photographic activity, e.g., as development inhibitor or accelerator, either directly or after removal of one or further groups from the group originally released. Examples of such 2-equivalent couplers include the known DIR couplers as well as DAR and FAR couplers. Typical examples of said couplers are described in DE patents 2,703,145, 2,855,697, 3,105,026, 3,319,428, 1,800,420, 2,015,867, 2,414,006, 2,842,063, 3,427,235, 3,209,110, and 1,547,640, GB 953, 454 and 1,591,641, EP 89,843, 117,511, 118,087, and 301, 477 and in Research Disclosure 308119, Section VII, 1989.

Examples of non-color forming DIR coupling compounds which can be used in silver halide color elements include those described in U.S. Pat. Nos. 3,938,996; 3,632,345; 3,639,417; 3,297,445 and 3,928,041; DE 2,405,442; 2,523, 705; 2,460,202; 2,529,350 and 2,448,063; JP 143,538/75 and 147,716/75, GB 1,423,588 and 1,542,705 and 301,477 and in Research Disclosure 308119, Section VII, 1989.

In order to introduce the couplers into the silver halide emulsion layer, some conventional methods known to the skilled in the art can be employed. According to U.S. Pat. Nos. 2,322,027, 2,801,170, 2,801,171 and 2,991,177, the couplers can be incorporated into the silver halide emulsion layer by the dispersion technique, which consists of dissolving the coupler in a water-immiscible high-boiling organic solvent and then dispersing such a solution in a hydrophilic colloid under the form of very small droplets. The preferred hydrophilic colloid is gelatin, even if some other kinds of colloids can be used.

Another type of introduction of the couplers into the silver halide emulsion layer consists of the so-called "loaded-latex technique". A detailed description of such technique can be found in BE patents 853,512 and 869,816, U.S. Pat. Nos. 4,214,047 and 4,199,363 and EP 14,921. It consists of mixing a solution of the couplers in a water-miscible organic solvent with a polymeric latex consisting of water as a continuous phase and of polymeric particles having a mean diameter ranging from 0.02 to 0.2 $\mu$m as a dispersed phase.

Another useful method is further the Fisher process. According to such a process, couplers having a water-soluble group, such as a carboxyl group, a hydroxy group, a sulfonic group or a sulfonamido group, can be added to the photographic layer for example by dissolving them in an alkaline water solution.

Useful methods of introduction of couplers into silver halide emulsions are described in Research Disclosure 308119, Section VII, 1989.

The layers of the photographic element can be coated on a variety of supports, such as cellulose ester supports (e.g., cellulose triacetate supports), paper supports, polyester film supports (e.g., polyethylene terephthalate or PET film supports and polyethylene naphthalate or PEN film supports), and the like, as described in Research Disclosure 308119, Section XVII, 1989. Preferred supports are the polyester film supports, well known in the art and that can be prepared from any of the polyester compositions described, for example, in U.S. Pat. Nos. 2,943,937 or 2,627,088. Suitable polyesters for use as supports include those prepared from dicarboxylic acids or derivatives thereof such as terephthalic acid, isophthalic acid, 2,6-naphthalene dicarboxylic acid, 2,7-naphthalene dicarboxylic acid, adipic acid, succinic acid and mixtures thereof and glycols, such as, ethylene glycol, propylene glycol, bytylene glycol, hexamethylene glycol, cyclohexane diol and mixtures thereof. Especially useful polyester film supports are polyethylene terephthalate (PET) or polyethylene naphthalate (PEN).

The supports preferably are initially treated with a surface activation treatment such as, for example, a corona discharge treatment, a glow discharge treatment, an active plasma treatment, a chemical treatment, a mechanical treatment, a UV treatment, flame and similar. The preferred methods are corona discharge treatment, as described, for example, in U.S. Pat. Nos. 4,055,685; 4,135,932; 4,220,471 and 5,194,291; and glow discharge treatment as described, for example, in U.S. Pat. Nos. 3,288,638; 4,451,497; 4,933, 267 and 5,425,980. The photographic elements according to this invention can be processed after exposure to form a visible image. During processing, the photographic compound of formula (2) will be generally bleached and/or discharged. Typically, after processing, the yellow filter layer will contribute less than 0.05, preferably less than 0.02, density units to the minimum density areas of the exposed and processed element. Processing can be the common processing employed to develop color photographic elements. A negative colored image can be obtained by color development followed by bleaching and fixing. Development is obtained by contacting the exposed silver halides of the element with an alkaline aqueous medium in the presence of an aromatic primary amine color developing agent contained in the medium or in the material, as known in the art. The aromatic primary amine color developing agent used in the photographic color developing composition can be any of known compounds of the class of p-phenylenediamine derivatives, widely employed in various color photographic process. Particularly useful color developing agents are the p-phenylenediamine derivatives, especially the N,N-dialkyl-p-phenylenediamine derivatives wherein the alkyl groups or the aromatic nucleus can be substituted or not substituted.

Examples of p-phenylenediamine developers include the salts of N,N-diethyl-p-phenylenediamine, 2-amino-5-diethylamino-toluene, 4-amino-N-ethyl-N-(α-methanesulfonamidoethyl)-m-toluidine, 4-amino-3-methyl-N-ethyl-N-(α-hydroxy-ethyl)-aniline, 4-amino-3-(α-methylsulfonamidoethyl)-N,N-diethylaniline, 4-amino-N,N-diethyl-3-(N'-methyl-α-methylsulfonamido)-aniline, N-ethyl-N-methoxy-ethyl-3-methyl-p-phenylenediamine and the like, as described, for instance, in U.S. Pat. Nos. 2,552,241; 2,556,271; 3,656,950 and 3,658,525.

Examples of commonly used developing agents of the p-phenylenediamine salt type are: 2-amino-5-diethylaminotoluene hydrochloride (generally known as CD2 and used in the developing solutions for color positive photographic material), 4-amino-N-ethyl-N-(α-methanesulfonamidoethyl)-m-toluidine sesquisulfate monohydrate (generally known as CD3 and used in the developing solution for photographic papers and color reversal materials) and 4-amino-3-methyl-N-ethyl-N-(β-hydroxyethyl)-aniline sulfate (generally known as CD4 and used in the developing solutions for color negative photographic materials).

The color developing agents are generally used in a quantity from about 0.001 to about 0.1 moles per liter, preferably from about 0.0045 to about 0.04 moles per liter of photographic color developing compositions.

In the case of color photographic materials, the processing comprises at least a color developing bath and, optionally, a prehardening bath, a neutralizing bath, a first (black and white) developing bath, etc. These baths are well known in the art and are described for instance in Research Disclosure 17643, 1978, and in Research Disclosure 308119, Sections XIX and XX, 1989.

After color development, the image-wise developed metallic silver and the remaining silver salts generally must be removed from the photographic element. This is performed in separate bleaching and fixing baths or in a single bath, called blix, which bleaches and fixes the image in a single step. The bleaching bath is a water solution having a pH equal to 5.60 and containing an oxidizing agent, normally a complex salt of an alkali metal or of ammonium and of trivalent iron with an organic acid, e.g., EDTA.Fe.NH4, wherein EDTA is the ethylenediamino-tetraacetic acid, or PDTA.Fe.NH4, wherein PDTA is the propylenediaminotetraacetic acid. While processing, this bath is continuously aired to oxidize the divalent iron which forms while bleaching the silver image and regenerated, as known in the art, to maintain the bleach effectiveness. The low quality working characteristics of these operations may cause the drawback of the loss of cyan density of the dyes.

Further to the above mentioned oxidizing agents, the blix bath can contain known fixing agents, such as for example ammonium or alkali metal thiosulfates. Both bleaching and fixing baths can contain other additives, e.g., polyalkyleneoxide compounds, as described for example in GB patent 933,008 in order to increase the effectiveness of the bath, or thioether compounds known as bleach accelerators.

The present invention will be illustrated with reference to the following examples, but it should be understood that these examples do not limit the present invention.

EXAMPLES

Sample 1 (comparison). 4 g of the photographic compound (I-1) used in the present invention were dissolved in a mixture of 8 g of tricresylphosphate (TCP) and 8 g of ethyl acetate as auxiliary solvent. The mixture was added to 60 g of an aqueous 10% by weight gelatin solution and 6 g of an aqueous 10% by weight Hostapur™SAS (a trade mark of Hoechst AG, West Germany, for an alkane sulfonate) solution as an anionic surfactant using a Polytron™PT 6045/6 equipment. Water was added to make 100 grams of final dispersion.

Sample 2 (comparison) was prepared as Sample 1, but the TCP has been replaced by dibuthylphthalate (DBP), in the same amount (8 g).

Sample 3 (invention) was prepared as Sample 1, but the TCP has been replaced by sucrose diacetate hexaisobutyrate (commercially available from Eastman Chemical Co. as SAIB™100), in the same amount.

Sample 4 (invention) was prepared as Sample 3, with the addition in the oil phase of 1 g of sorbitan monolaurate (commercially available from Atlas/ICI as Span™20).

Sample 5 (invention) was prepared as Sample 4, with the addition in the oil phase of 2 g of sorbitan monolaurate.

Sample 6 (invention) was prepared as Sample 1, but the TCP has been replaced by sucrose benzoate (commercially available from Uniplex Chemical Co. as Uniplex™ 280 CG), in the same amount.

The final composition of the dispersions is reported below in Tab. 1 expressed in grams of the individual materials per 100 grams of final dispersion:

TABLE 1

|  | Sample 1 (comp.) | Sample 2 (comp.) | Sample 3 (invent.) | Sample 4 (invent.) | Sample 5 (invent.) | Sample 6 (invent.) |
|---|---|---|---|---|---|---|
| Photographic compound (I-1) | 4 | 4 | 4 | 4 | 4 | 4 |
| TCP | 8 | | | | | |
| DBP | | 8 | | | | |
| SAIB ™ 100 | | | 8 | 8 | 8 | |
| Sucrose benzoate | | | | | | 8 |
| Ethyl acetate | 8 | 8 | 8 | 8 | 8 | 8 |
| Span 20 | | | | 1 | 2 | |
| Gelatine 10% | 60 | 60 | 60 | 60 | 60 | 60 |
| Hostapur ™ SAS 10% | 6 | 6 | 6 | 6 | 6 | 6 |
| Water to make 1 Liter | | | | | | |

The cold room shelf life (about 5° C.) of the Samples 1–6 was monitored through drop size distribution measurements carried out with a Malvern Mastersizer™ (Light Laser Scattering) equipment, measured in μm. The results are reported in Tab.2.

TABLE 2

|  | Sample 1 (comp.) | Sample 2 (comp.) | Sample 3 (invent.) | Sample 4 (invent.) | Sample 5 (invent.) | Sample 6 (invent.) |
|---|---|---|---|---|---|---|
| Fresh | 0.38 | 0.38 | 0.32 | 0.26 | 0.26 | 0.22 |
| 3 days 5° C. | 0.41 | 0.45 | 0.36 | 0.32 | 0.26 | 0.22 |
| 7 days 5° C. | 0.45 | 0.43 | 0.39 | 0.32 | 0.26 | 0.22 |
| 15 days 5° C. | 0.53 | 0.53 | 0.43 | 0.38 | 0.32 | 0.22 |
| 30 days 5° C. | 0.75 | 0.67 | 0.45 | 0.38 | 0.33 | 0.22 |

Table 2 shows that the distribution size of comparison Samples 1 and 2, obtained by a dispersion process using TCP and DBP as permanent solvent, greatly increases during long storage. On the contrary, Samples 3–6 obtained by a dispersion process according to the present invention show only a little variation of said values.

What is claimed is:

1. A process for preparing a dispersion which comprises codispersing in an aqueous medium a sucrose derivative represented by general formula (1):

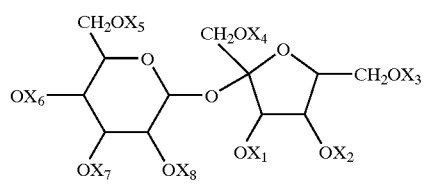

formula (1)

wherein substituents $X_1$ to $X_8$, being the same or different, represent a hydrogen atom, an alkyl group or an acyl group, with the proviso that at least four of the $X_1$ to $X_8$ substituents are different from hydrogen and that the total sum of the carbon atoms of $X_1$ to $X_8$ substituents is at least sixteen;

and a photographic compound represented by general formula (2):

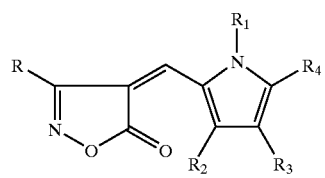

formula (2)

wherein R and $R_1$ each independently represents a hydrogen atom, an alkyl group, an alkylene group, a heterocyclic group or an aryl group; $R_2$, $R_3$ and $R_4$ each independently represent a hydrogen atom, an alkyl group, an aryl group, and $R_3$ and $R_4$ may be combined to form a 6-membered ring.

2. A process for preparing a dispersion according to claim 1, wherein at least six of the $X_1$ to $X_8$ substituents are different from hydrogen.

3. A process for preparing a dispersion according to claim 1, wherein all the $X_1$ to $X_8$ substituents are different from hydrogen.

4. A process for preparing a dispersion according to claim 1, wherein the total sum of the carbon atoms of $X_1$ to $X_8$ substituents is at least twenty.

5. A process for preparing a dispersion according to claim 1, wherein the total sum of the carbon atoms of $X_1$ to $X_8$ substituents is at least twentyfour.

6. A process for preparing a dispersion according to claim 1, wherein $X_1$ to $X_8$ are acyl groups.

7. A process for preparing a dispersion according to claim 1, wherein the sucrose derivative is selected from the group consisting of a sucrose benzoate, a sucrose diacetate hexaisobutyrate, sucrose diacetate hexabutyrate, sucrose diacetate hexapropionate or sucrose triacetate pentaisobutyrate.

8. A process for preparing a dispersion according to claim 1, wherein a nonionic surfactant is used.

9. A process for preparing a dispersion according to claim 8, wherein the nonionic surfactant is selected from the group consisting of polyoxyethylene alkyl ethers, polyoxyethylene alkyl aryl ethers, polyoxyethylene-polyoxypropylene block copolymers, sorbitan fatty acid esters, and polyoxyethylene sorbitan fatty acid esters.

10. A process for preparing a dispersion according to claim 8, wherein the nonionic surfactant is selected from the group consisting of a sorbitan fatty acid esters.

11. A process for preparing a dispersion according to claim 1, wherein the photographic compound is a dye.

12. A process for preparing a dispersion according to claim 1, wherein the photographic compound is represented by the formula:

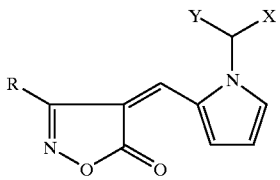

wherein R represents a hydrogen atom, an alkyl group, a heterocyclic group or an aryl group, X represents a hydrogen atom or a 1 to 6 carbon atom alkyl group, and Y represents $-COO-(CH_2-CH_2-O)_n-Z$ or $-COO-(CH(CH_3)-CH_2-O)_n-Z$, where n=0,1,2 or 3 and Z being a 1 to 4 carbon atom alkyl group.

13. A process for preparing a dispersion according to claim 1, wherein the photographic compound to sucrose derivative weight ratio is in the range from 0.5:1 to 4:1.

14. A process for preparing a dispersion according to claim 1, wherein the photographic compound to sucrose derivative weight ratio is in the range from 1:1 to 3.1.

15. A photographic dispersion comprising photographic silver halide grains and, codispersed in an aqueous medium, a sucrose derivative represented by general formula (1):

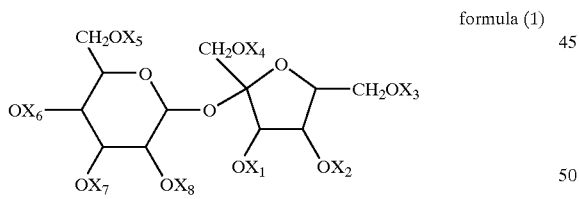

formula (1)

wherein substituents $X_1$ to $X_8$, being the same or different, represent a hydrogen atom, an alkyl group or an acyl group, with the proviso that at least four of the $X_1$ to $X_8$ substituents are different from hydrogen and that the total sum of the carbon atoms of $X_1$ to $X_8$ substituents is at least sixteen;

and a photographic compound represented by general formula (2):

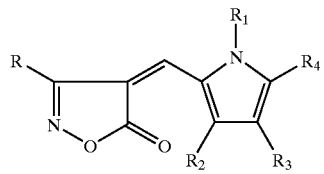

formula (2)

wherein R and $R_1$ each independently represents a hydrogen atom, an alkyl group, an alkylene group, a heterocyclic group or an aryl group; $R_2$, $R_3$ and $R_4$ each independently represent a hydrogen atom, an alkyl group, an aryl group and $R_3$ and $R_4$ may be combined to form a 6-membered ring.

16. A photographic element comprising a film support base having coated on one side thereof at least one hydrophilic colloid emulsion layer containing a photographic dispersion comprising, codispersed in an aqueous medium, a sucrose derivative represented by general formula (1):

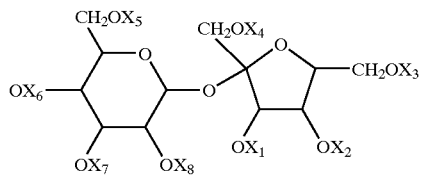

formula (1)

wherein substituents $X_1$ to $X_8$, being the same or different, represent a hydrogen atom, an alkyl group or an acyl group, with the proviso that at least four of the $X_1$ to $X_8$ substituents are different from hydrogen and that the total sum of the carbon atoms of $X_1$ to $X_8$ substituents is at least sixteen;

and a photographic compound represented by general formula (2):

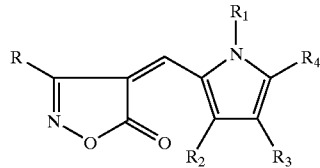

formula (2)

wherein R and $R_1$ each independently represents a hydrogen atom, an alkyl group, an alkylene group, a heterocyclic group or an aryl group; $R_2$, $R_3$ and $R_4$ each independently represent a hydrogen atom, an alkyl group, an aryl group and $R_3$ and $R_4$ may be combined to form a 6-membered ring.

* * * * *